US010466910B1

(12) United States Patent
Dolan et al.

(10) Patent No.: US 10,466,910 B1
(45) Date of Patent: Nov. 5, 2019

(54) DYNAMIC RESOURCE PARTITIONING

(71) Applicant: EMC IP Holding Company LLC, Hopkinton, MA (US)

(72) Inventors: Sean C. Dolan, Southborough, MA (US); Amnon Naamad, Brookline, MA (US); Hui Wang, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 15/395,081

(22) Filed: Dec. 30, 2016

(51) Int. Cl.
*G06F 3/06* (2006.01)

(52) U.S. Cl.
CPC .......... *G06F 3/0611* (2013.01); *G06F 3/0631* (2013.01); *G06F 3/0659* (2013.01); *G06F 3/0683* (2013.01)

(58) Field of Classification Search
CPC ..... G06F 3/0653; G06F 3/0659; G06F 9/5083
See application file for complete search history.

(56) References Cited

U.S. PATENT DOCUMENTS

| | | | |
|---|---|---|---|
| 7,031,928 B1 * | 4/2006 | Cochran | G06F 3/061 705/7.11 |
| 7,281,105 B1 * | 10/2007 | Wang | G06F 3/061 711/112 |
| 7,558,919 B1 | 7/2009 | Yochai et al. | |
| 7,640,342 B1 | 12/2009 | Aharoni et al. | |
| 8,335,904 B1 | 12/2012 | Kitchen et al. | |
| 8,381,213 B1 | 2/2013 | Naamad et al. | |
| 8,433,848 B1 | 4/2013 | Naamad et al. | |
| 8,528,049 B1 | 9/2013 | Khen et al. | |
| 8,566,549 B1 | 10/2013 | Burke et al. | |
| 8,583,838 B1 | 11/2013 | Marshak et al. | |
| 8,707,308 B1 | 4/2014 | Naamad et al. | |
| 8,713,261 B1 | 4/2014 | Aharoni et al. | |
| 8,856,397 B1 | 10/2014 | Marshak et al. | |
| 8,924,675 B1 | 12/2014 | Burke et al. | |
| 8,935,490 B1 | 1/2015 | Naamad et al. | |
| 8,935,493 B1 | 1/2015 | Dolan et al. | |
| 8,954,381 B1 | 2/2015 | Naamad | |
| 9,003,157 B1 | 4/2015 | Marshak et al. | |
| 9,026,765 B1 | 5/2015 | Marshak et al. | |
| 9,052,830 B1 | 6/2015 | Marshak et al. | |
| 9,189,387 B1 | 11/2015 | Taylor et al. | |
| 9,235,516 B1 | 1/2016 | Marshak et al. | |

(Continued)

*Primary Examiner* — Charles Rones
*Assistant Examiner* — Hewy H Li
(74) *Attorney, Agent, or Firm* — Muirhead and Saturnelli, LLC

(57) ABSTRACT

Dynamic resource partitioning techniques may include receiving a plurality of performance goals for a plurality of consumers, each of the plurality of performance goals denoting a performance goal for a different one of the plurality of consumers; performing first processing to determine whether one or more of a plurality of subsystems are overloaded and whether there is at least a first consumer of the plurality of consumers violates a corresponding one of the plurality of performance goals specified for said first consumer; and responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded.

19 Claims, 8 Drawing Sheets

(56) References Cited

U.S. PATENT DOCUMENTS

| | | | |
|---|---|---|---|
| 9,282,053 | B1 | 3/2016 | Naamad et al. |
| 9,317,224 | B1 | 4/2016 | Aharoni et al. |
| 9,323,459 | B1 | 4/2016 | Marshak et al. |
| 9,335,948 | B1 | 5/2016 | Kirac et al. |
| 9,459,799 | B1 | 10/2016 | Naamad |
| 2006/0090163 | A1* | 4/2006 | Karisson ............. G06F 11/3409 718/105 |
| 2007/0112723 | A1* | 5/2007 | Alvarez .................... G06F 9/50 |
| 2013/0227111 | A1* | 8/2013 | Wright .................. G06F 9/5083 709/223 |
| 2015/0058843 | A1* | 2/2015 | Holler .................... G06F 9/455 718/1 |

\* cited by examiner

DYNAMIC RESOURCE PARTITIONING

BACKGROUND

Technical Field

This application generally relates to dynamic resource partitioning.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to, and/or retrieve data from, a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of the invention is a method of performing dynamic resource partitioning comprising: receiving a plurality of performance goals for a plurality of consumers, each of the plurality of performance goals denoting a performance goal for a different one of the plurality of consumers; performing first processing to determine whether one or more of a plurality of subsystems are overloaded and whether there is at least a first consumer of the plurality of consumers violates a corresponding one of the plurality of performance goals specified for said first consumer; and responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded. The plurality of consumers may be a plurality of storage groups for a plurality of applications. Each of the plurality of storage groups may include one or more logical devices comprising data for a corresponding one of the plurality of applications whereby the corresponding one application may issue I/O operations to the one or more logical devices of the storage group. The first processing may include determining whether a first subsystem of a plurality of subsystems is overloaded. The first subsystem may be determined as overloaded when a current utilization of components of the first subsystem exceeds a specified maximum threshold utilization. Each of the plurality of performance goals may denote a performance goal for a corresponding one of the plurality of storage groups and may include a provisioned throughput and a provisioned maximum response time. The performance goal for the corresponding one storage group may indicate a goal of maintaining a current response time for the corresponding one storage group that does not exceed the provisioned maximum response time of the performance goal when a current throughput for the corresponding one storage group does not exceed the provisioned throughput of the performance goal. The provisioned maximum response time may denote an average I/O response time for the corresponding one of the plurality of storage groups, and wherein the provisioned throughput may include any of: an average I/O throughput, and an average data transfer rate. The provisioned throughput and the provisioned maximum response time may be determined with respect to I/Os that are directed to the corresponding one storage group and are received by a system comprising the plurality of subsystems. A first of the plurality of performance goals may denote a performance goal for a first of the plurality of storage groups. The first storage group may be determined as violating its performance goal denoted by the first performance goal whereby a current throughput for the first storage group does not exceed the provisioned throughput of the first performance goal and whereby a current response time for the first storage group exceeds the provisioned maximum response time of the first performance goal. The second processing may select a first set of one or more of the plurality of storage groups upon which to impose I/O throttling limits to reduce a current load of the first subsystem determined as overloaded. Each storage group of the first set may have a corresponding one of the plurality of performance goals and each storage group may have a current throughput that exceeds the provisioned throughput of the corresponding performance goal for the storage group. An I/O throttling limit for the storage group of the first set may denote a maximum allowable throughput temporarily imposed for the storage group. The maximum allowable throughput may not be less than the provisioned throughput of the corresponding one of the plurality of performance goals for said each storage group and whereby the maximum allowable throughput is temporarily used rather than the provisioned throughput of the corresponding performance goal for said each storage group. The I/O throttling limit for each storage group may be enforced by reducing measured throughput for the storage group whereby the measured throughput for the storage group does not exceed the maximum allowable throughput imposed for the storage group. Each storage group of the first set of one or more storage groups may selected in accordance with one or more criteria comprising at least one of: a level of selectivity of said each storage group related to an amount of I/O workload of said each storage group that is directed to the first subsystem; an amount by which said each storage group exceeds the current throughput for said each storage group exceeds the provisioned throughput of the corresponding performance goal for said each storage group; an amount by which said each storage group exceeds the provisioned maximum response time of the corresponding performance goal for said each storage group; and a priority of said each storage group relative to other ones of the plurality of storage groups. The plurality of subsystems may be included in a data storage system. The plurality of subsystems may include a first subsystem of front end components, a second subsystem of back end components, and a third subsystem of physical storage devices. The third subsystem may include a plurality of pools each including a plurality of physical storage devices. The second subsystem may include processors and ports of components that read data from, and write data to, the physical storage devices of the third subsystem. The first subsystem may include processors and ports of components that receive I/O operations from the plurality of applications executing on one or more host systems. The plurality of subsystems may include a fourth subsystem of components that facilitate processing for received I/Os and perform data services not handled by the first subsystem and the second subsystem.

In accordance with another aspect of the invention is a system comprising: a processor; and a memory comprising code stored thereon that, when executed, performs a method of dynamic resource partitioning comprising: receiving a plurality of performance goals for a plurality of consumers, each of the plurality of performance goals denoting a performance goal for a different one of the plurality of consumers; performing first processing to determine whether one or more of a plurality of subsystems are overloaded and whether there is at least a first consumer of the plurality of consumers that violates a corresponding one of the plurality of performance goals specified for said first consumer; and responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded.

In accordance with another aspect of the invention is a computer readable medium comprising code stored thereon that, when executed, performs method of dynamic resource partitioning comprising: receiving a plurality of performance goals for a plurality of consumers, each of the plurality of performance goals denoting a performance goal for a different one of the plurality of consumers; performing first processing to determine whether one or more of a plurality of subsystems are overloaded and whether there is at least a first consumer of the plurality of consumers violates a corresponding one of the plurality of performance goals specified for said first consumer; and responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
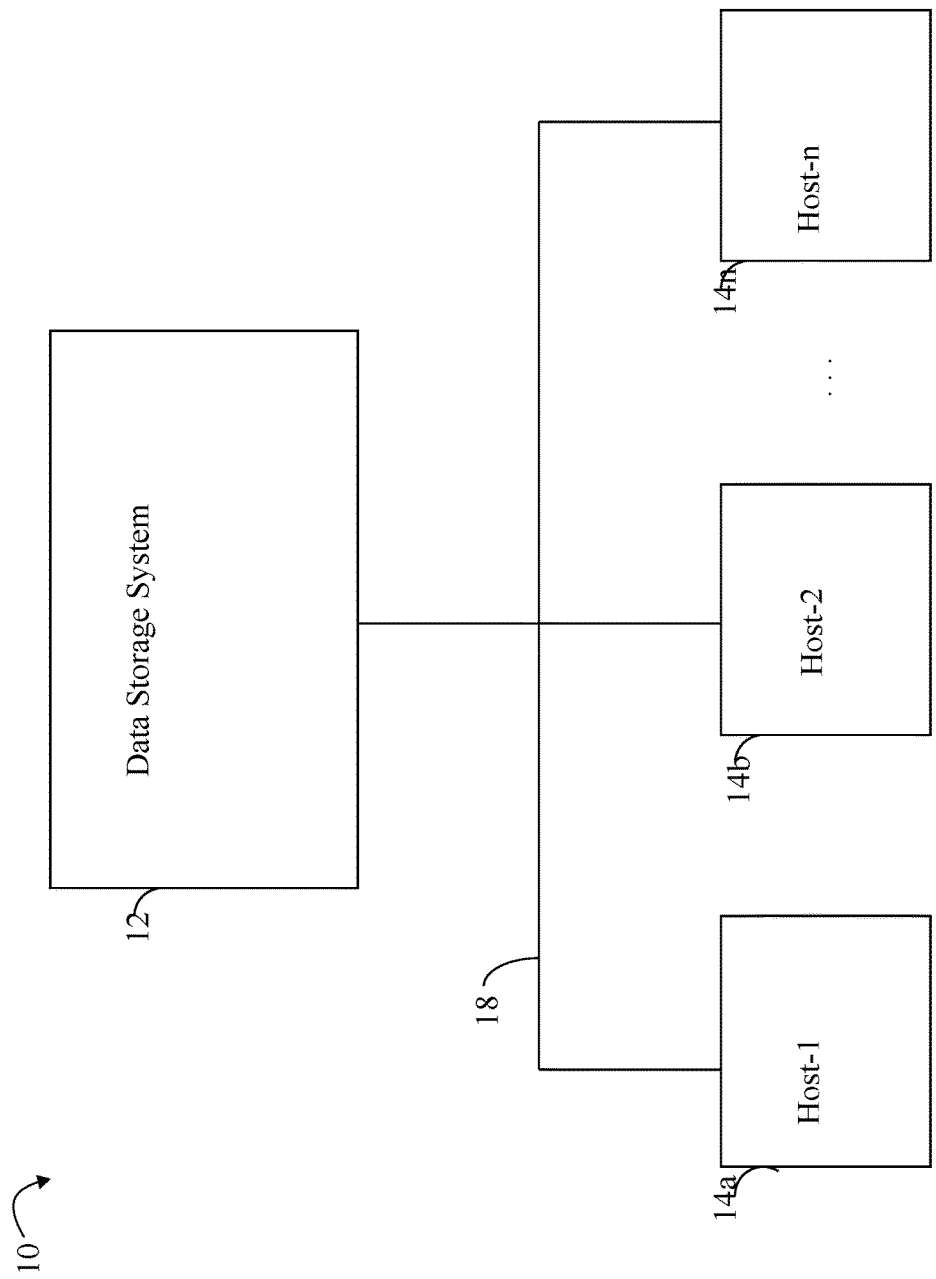
FIGS. 1 and 2 are examples of components that may be included in an embodiment utilizing techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as a Symmetrix® VMAX® data storage system, as well one or more other data storage systems as may vary with the embodiment.

Figure 2:
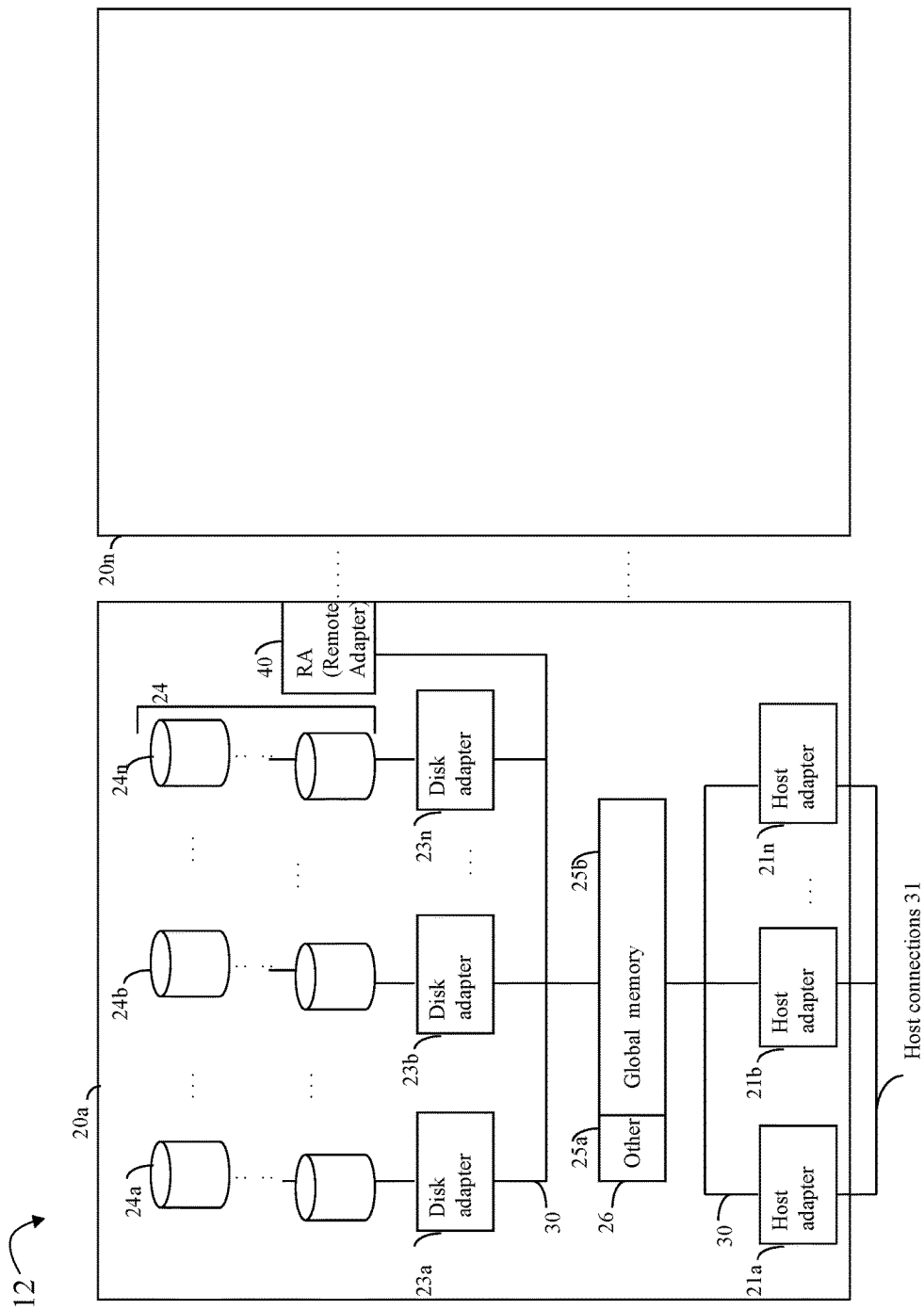

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices (e.g., non-volatile storage). Data in a single storage system may be accessed by multiple hosts allowing the hosts to share the data residing therein. The HAs may be used in connection with communications between a data storage system and a host system.

The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2).

It should be noted that the particular architecture of a data storage system such as described herein is merely illustrative of one such architecture that may be used in connection with techniques herein. Those skilled in the art will appreciate that techniques herein may be used with any suitable data storage system.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

Embodiments in accordance with techniques herein may be include a physical data storage system and its physical components (e.g., physical hardware for each HA, DA, HA port and the like). In at least one embodiment in accordance with techniques, the data storage system may include one or more emulated or virtualized components (e.g., emulated or virtualized ports, emulated or virtualized DAs or HAs (e.g., code executing on a processor in the context of a virtual machine).

A challenge faced by a data storage system, or more generally any suitable system, that accommodates multiple tenant storage workloads is the management of tradeoffs related to avoiding unwanted performance interactions, such as those causing overloading of system resources due to overconsumption, between the tenant workloads while still making maximum use of the performance capacity of the storage system. Some existing system may use static partitioning of storage system resources in efforts to avoid unwanted performance interactions. However, such static partitioning techniques may result in wasted performance capacity (e.g., reserved for a particular tenant but remain unused). An alternative to static resource partitioning is the use of a dynamic resource partitioning scheme. With dynamic resource partitioning such as described in embodiments in following paragraphs, the storage system may continually observe system status and tenant workload goal status (e.g., specified target performance goals per tenant) to determine when to make suitable adjustments to the partitioning of performance capacity that is made available to particular tenant workloads. Dynamic performance resource partitioning approaches offer the potential for greater performance capacity utilization (as compared generally to static partitioning techniques) while still providing a degree of protection against undesirable performance interactions, such as those related to resource contention, overload of system resources, and/or overconsumption of system resources by one or more tenants). The effectiveness of a dynamic partitioning scheme may be evaluated by the actual degree to which the technique is able to achieve these foregoing two competing goals. Described in following paragraphs are dynamic resource partitioning techniques which may throttle down (e.g., slow down) processing of selected application workloads whereby such applications may selected due to the fact that the applications are consumers of data storage system resources identified as bottlenecks or in high demand. Such resources as described in following paragraphs may be further characterized as resources in contention between multiple application workloads and such resources may be characterized as overloaded, such as having a current utilization rate exceeding a desired utilization threshold.

In following paragraphs, a storage group (SG) may be characterized as a logical grouping of one or more LUNs to which an I/O workload of a particular application is directed. The particular application issues I/Os to the LUNs of its associated or corresponding SG and thus the application, and also the SG, may generally denote a tenant or consumer of resources of the data storage system. In at least one embodiment in accordance with techniques described in following paragraphs, the system may be a data storage system with consumers which are SGs (e.g., applications) that consume/use resources of the data storage system such as in connection with I/Os issued by the applications to such SGs. Techniques in following paragraphs throttle down or restrict the I/O workload of one or more selected SGs or applications identified as consuming more than a threshold level of resources, as included in a performance goal defined for each SG or application. Such throttling down may be performed responsive to determining a subsystem within the data storage system is overloaded. In at least one embodiment, the data storage system may be generally partitioned into a plurality of subsystems and a subsystem may be characterized as overloaded if the utilization for such subsystem is above a specified threshold utilization. Additionally, such throttling down may be performed when at least one application or SG is not meeting its specified performance goal, or characterized another way, has a performance goal violation. In one embodiment, each application or SG may have a defined performance goal (also referred to herein as provisioned performance capacity) including a provisioned throughput and provisioned maximum response time (MAX RT). The performance goal for an SG or application indicates a performance goal that the current or measured RT for the SG will not exceed the MAX RT so long as the SG has a corresponding I/O workload directed to the SG's LUNs which does not exceed the specified provisioned throughput. The provisioned throughput includes one or more metrics denoting an amount of resource consumption. In at least one embodiment, the provisioned throughput may be expressed as an amount of throughput measured in terms of front end or host I/Os per second (IOPS) (e.g., I/O throughput), and/or data transfer, such as a data transfer rate (e.g. amount of data transferred per unit of time such as megabytes per second). An embodiment may specify performance goals for application including provisioned throughput expressed using only the I/O throughput, only the data transfer rate, or include both of the foregoing. Thus, techniques herein for throttling down I/O workloads of selected applications may be performed responsive to two conditions being detected—at least one subsystem is overloaded and at least one SG or application experiencing a performance goal violation, whereby the application or SG has a current I/O workload which does not exceed the provisioned throughput of the SG's performance goal. However, the application or SG and yet has a measured RT that exceeds its specified performance target goal of MAX RT. The one or more applications selected for throttling down their I/O workloads may be identified as an application having a current provisioned throughput exceeding the provisioned throughput specified in the performance goal for the application (e.g., application is consuming more resources than promised or guaranteed in its performance goal). The foregoing and other aspects of techniques herein are described in more detail in following paragraphs.

In at least one embodiment in accordance with techniques herein, an application or SG workload may be slowed or throttled downward by the data storage system generally introducing an additional amount of I/O wait time in connection with processing I/Os received where the I/Os are directed to the particular SG. The throttling down may be performed by controlling the rate at which I/Os directed to the SG are processed, for example, by reducing the current measured IOPS for the SG (e.g., data storage system slows down or reduces the rate at which I/O processing is performed on the data storage system for that particular SG by adding additional I/O wait time to I/Os directed to the SG). Such additional I/O wait time may be introduced in any suitable manner, for example, by delaying returning an acknowledgement regarding an I/O operation to the issuing host application.

In accordance with one aspect, techniques herein exploit available information about the performance state of subsystems within the storage system together with information about how much load each tenant workload is placing on each particular subsystem. The foregoing may be used in an embodiment of the partitioning techniques described herein to identify where (e.g., what subsystem or resources) reductions in load are needed, and which reductions in tenant workload throughput will most directly achieve the needed reductions. This, in turn, translates to the ability to achieve a given degree of protection from undesirable performance interactions (e.g., resource contention) while allowing higher levels of performance capacity utilization. Example embodiments are described herein that make such techniques scalable and may be practically applied for use in data storage systems with many thousands of tenant workloads (e.g., SGs I/O workloads).

Generally, the risk of performance interference between tenant workloads (also known as the 'noisy neighbor problem') is highest when the storage system has, or is close to, running out of performance capacity. In a typical enterprise storage system, there are a number of subsystems (e.g., such as controller CPUs, disks, ports, or communication links) that are used in the servicing of I/O requests and which may become overloaded. The potential for performance interactions exists whenever two or more tenant workloads simultaneously compete for access to the same overloaded subsystem. Note that the fraction of a given tenant workload that reaches a given subsystem may vary significantly depending on the storage system configuration and the character of the tenant workload.

When the partitioning processing of techniques herein respond to an overload event (which may span multiple sub-systems), the goal of the partitioning algorithm is to identify the optimal set of tenant performance capacity reductions to impose in order to relieve the overload condition(s). At a high level, this may accomplished as follows in at least one embodiment.

Techniques herein may use information for each tenant (e.g., SG) about the minimum amount of performance capacity that tenant should be able to count on achieving, including information about the response time goals of the tenant. These attributes are referred to as the provisioned performance capacity of the tenant. For example, provisioned performance capacity, also referred to herein as a performance goal such as for an SG, may be expressed using provisioned throughput and provisioned maximum response time. Consistent with other discussion herein, provisioned throughput refers to the amount of throughput (e.g., measured in terms of host TOPS and host data transfer) that a tenant should be able to count on being able to achieve. Provisioned maximum response time refers to a measure (e.g., a simple time average) of tenant response time that should not be exceeded. When a tenant is using more throughput than the provisioned allotment, the partitioning techniques may be performed to impose performance reductions on the tenant, down to the level of the provisioned capacity, when needed to protect the performance goals (also sometimes referred to as goals) of other tenants.

At regular defined time intervals, partitioning techniques herein may include evaluating the state of the storage system and the status of the tenant performance goals. If overload conditions exist, whereby such overload conditions cause or pose a threat to the achievement of tenant performance goals, then the partitioning techniques herein may determine how much load from such overloaded subsystems needs to be removed, and which tenant workloads should be the ones to give up performance capacity (e.g., reduce resource consumption).

Techniques herein use information about overload conditions at the subsystem-level and information about how much load particular tenants have been placing on each overloaded subsystem recently. This may be used as a forecast of the load the tenants would continue to deliver to determine the level of selectivity that each tenant has for each overloaded subsystem: if a tenant has a high selectivity for a given overloaded subsystem that means that the fraction of the tenant workload that actually reaches the overloaded component is high.

When overload of a subsystem is detected, processing may be performed to consider tenants that are using more than their provisioned performance capacity to be candidates for temporary performance capacity reductions. For example, which SGs are exceeding their respective provisioned throughput of corresponding SG performance goals. In at least one embodiment, if overload is encountered in a case where no workloads are over their provisioned performance throughput yet not meeting provisioned MAX RT goals, then temporary reductions may be made in provisioned throughput of some of the tenants. When determining the amount by which the provisioned throughput of a given tenant will be reduced at a given point, at least one embodiment may consider one or more factors including, for example, the relative business priority of the tenant, how long the overload condition has lasted, and/or other factors described herein.

When the partitioning technique performs processing to select tenants that will give up performance capacity, an embodiment may consider one or more factors or attributes of each tenant. Examples of such factors or attributes of each tenant may include:

The level of selectivity for the overloaded component (e.g., prefer to choose tenants with higher selectivity)

The fraction by which the tenant is exceeding its provisioned throughput allotment (prefer to choose tenants that are over their allotment by a greater fraction)

The amount of response time margin that exists in the workload (prefer to choose tenants that have better response times in relation to their goal)

The sensitivity of the tenant goal status to the impact of the particular performance reduction mechanism being considered (e.g., prefer to choose tenants whose chances to meeting its own goals will degrade more slowly when subject to performance reductions). This may also be referred to as a penalty denoting an adverse impact on a tenant, such as an SG with respect to its MAX RT of the SG's performance goal. For example, such a factor may result in selecting an SG which experiences the smallest penalty or negative adverse impact on RT. Such a factor may prefer selecting the SG which has an RT with the lowest/minimum difference with respect to the SG's MAX RT (e.g., is closest to its MAX RT).

The relative business priority of the tenant (prefer to choose tenants with lower business priority)

In at least one embodiment, a cost function may be formed based on one or more of the factors above, tailored for the particular subsystem that is overloaded and the particular form of performance reduction that would be used and the nature of the performance goals for the tenant workloads. Such a cost function may be used to select particular tenants and associated performance reductions to achieve the total needed reduction to reduce the load (e.g., utilization) of an overloaded subsystem (e.g. whereby the subsystem no longer exceeds a specified utilization threshold used to determine/classify the subsystem as overloaded). During each planning cycle in which overload is detected, processing may divide the total amount of reduction needed into quantums of performance capacity, and perform a loop over the quantums. For each quantum, the cost function may be used to determine the best tenant to subtract the quantum from. At the end of the loop over the quantums, the total needed performance capacity reductions for each tenant have been calculated, and may then be applied to the tenants.

In at least one embodiment, what-if models of subsystem utilization may be used in connection with deciding the total amount of performance capacity reduction needed to protect a given subsystem (e.g., used to determine the particular overload utilization threshold for each subsystem).

When applying performance reductions in response to an overload condition of at least one subsystem, in at least one embodiment, the partitioning technique may act as quickly (e.g., with different levels of aggressiveness) as the performance controls permit. The more quickly the system responds, the less performance interference there will be. Following the resolution of an overload condition, the partitioning technique may gradually relax (and ultimately remove) the performance constraints: by relaxing the constraints more slowly the chance of relapse is reduced. In at least one embodiment, techniques herein may pause the relaxation of constraints if storage system utilization levels are higher than a specified level.

When the partitioning techniques herein detect overload in multiple subsystems or components, there are a variety of ways to calculate the overall limit reductions needed. In at least one embodiment, processing may calculate performance capacity reductions for each tenant for overloaded component or subsystem separately, and then use an aggregated reduction for each tenant (e.g., aggregated for each tenant with respect to reductions across all overloaded components or subsystems).

Figure 3:
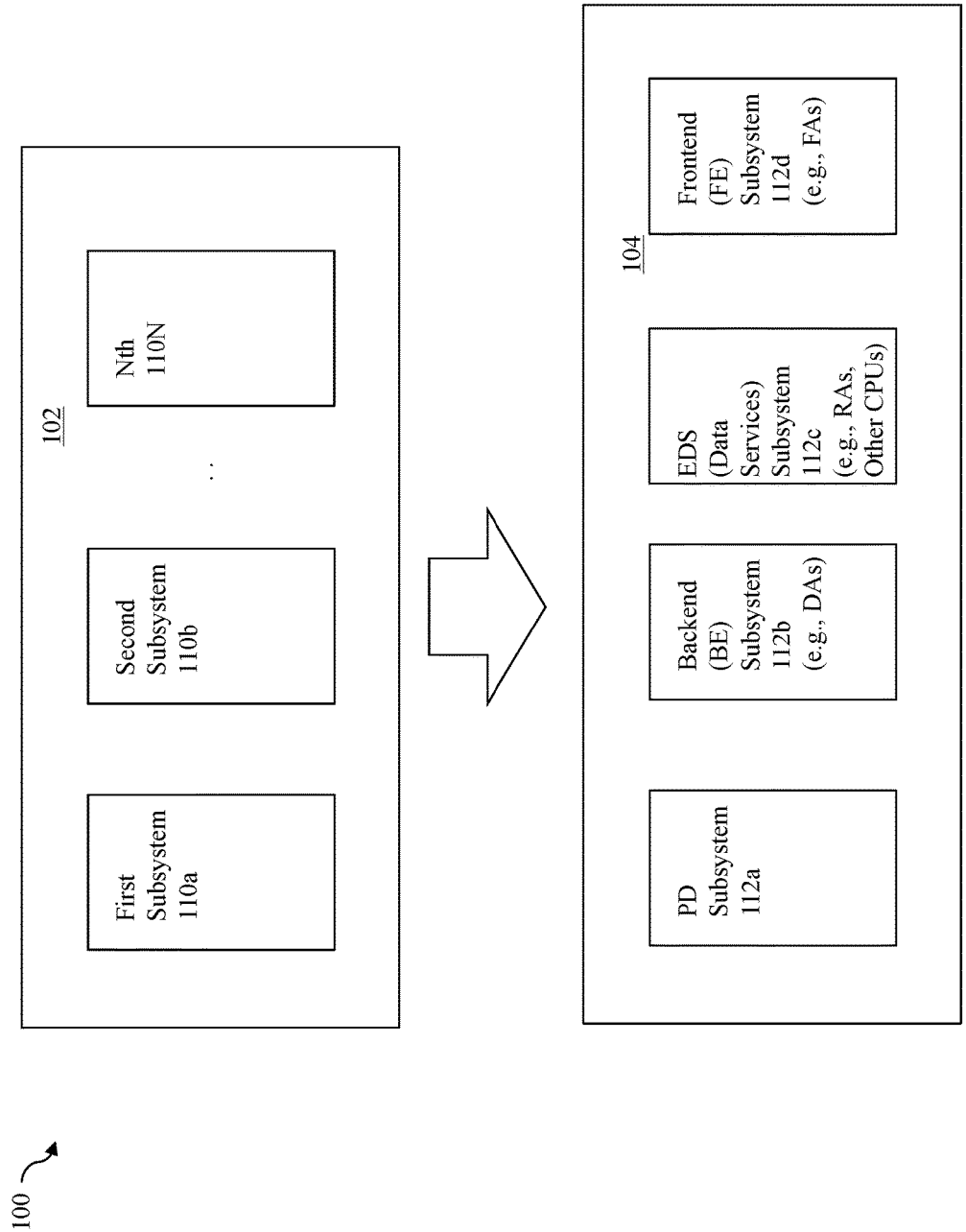
FIGS. 3, 4 and 5 are examples of subsystems that may be included in an embodiment in accordance with techniques herein.

Referring to FIG. 3, shown is an example of a system and subsystems that may be used in connection with techniques herein. Generally, the example 100 includes a system 102 which may have its components partitioned into any suitable number of subsystems 110a-110N. Each of the subsystems 110a-110N may denote a logical grouping of system resources. Element 104 shows one way in which resources of a data storage system may be divided into 4 subsystems 112a-112d. Element 112a may denote the physical storage devices or PDs (e.g. non-volatile backend storage devices having storage provisioned therefrom for LUNs of the SGs). Element 112b may denote the backend (BE) subsystem comprising backend components as described herein that are used in connection with reading data from, and writing data to, the PD subsystem 112a. For example, BE subsystem 112b may include DAs, processors, ports, and the like, used to access PDs of PD subsystem 112a. Element 112c may denotes the EDS or data services subsystem and include components that generally perform data services and tasks, such as processors executing code that perform tasks related to servicing host I/Os. Such components may include RAs and other CPUs or processors. Tasks performed by 112a components may include, for example, obtaining a cache slot, and performing other operations not performed by components of other subsystems 112a, 112b and 112d when servicing received I/Os.

Figure 4:
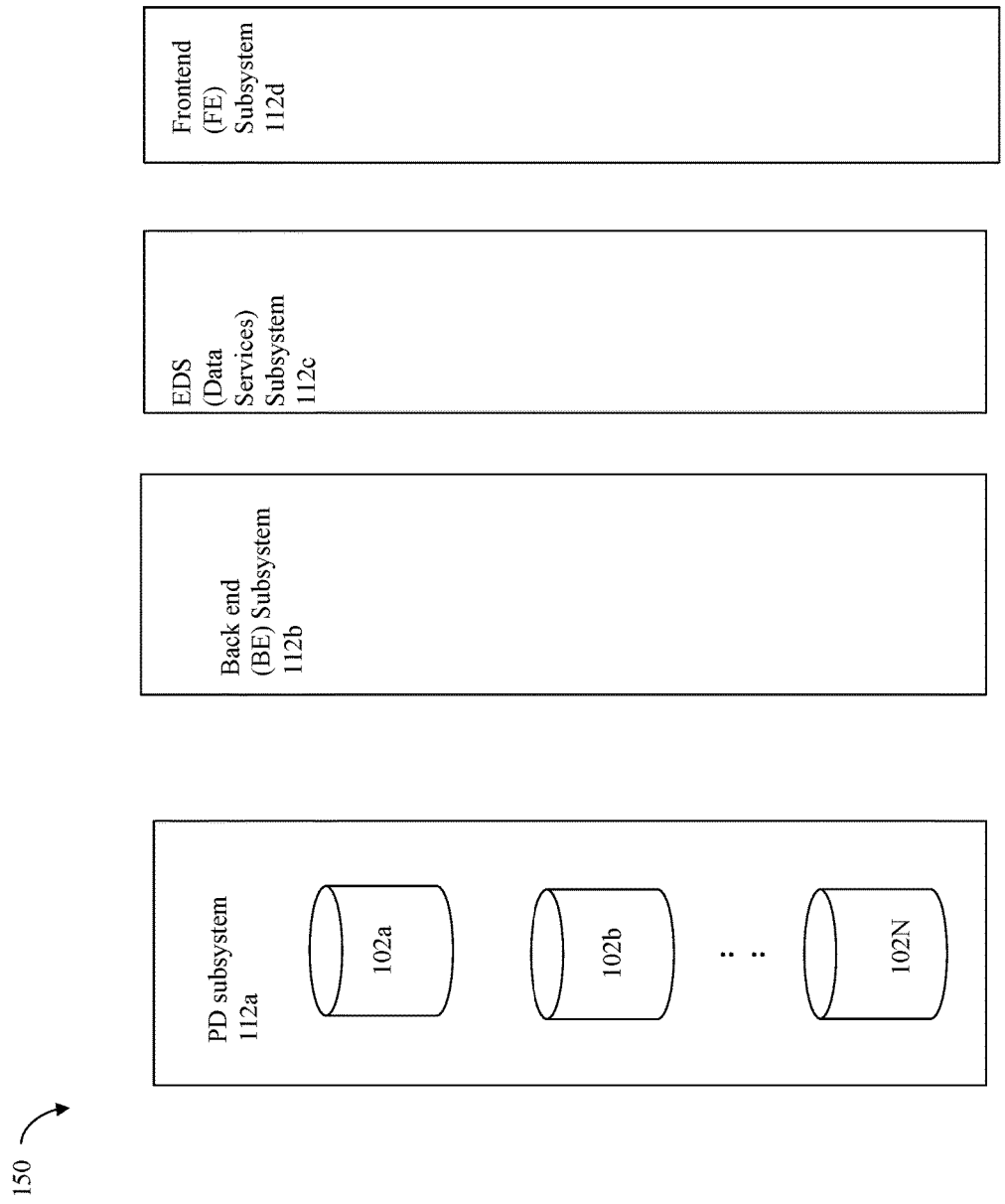

Referring to FIG. 4, shown is another example of how a data storage system may be partitioned into subsystems in an embodiment in accordance with techniques herein. The example 150 includes the same 4 subsystems as in 104 with the added difference of further partitioning/grouping components of the PD subsystem 112a. Generally, depending on the particular system configuration and information available (e.g., level of granularity at which various measurements, models, and the like, may be available or used), any one or more of the subsystems may be further divided into subsystems each denoting a subgrouping of components of the particular subsystem. For example, in at least one embodiment, performance information and utilization information may be available for PDs of the PD subsystem 112a per storage pool. In the example 150, each of 120a-102N may denote a different storage pool (SP) or pool of PDs. For example, each LUN of an SG may be currently located on/have storage provisioned from, one or more of the SPs 120a-N. Mapping information may be tracked and used with techniques herein to denote which one or more SPs 102a-n include physical storage provisioned for use each SG. In this manner, information regarding the SG I/O workload may be mapped to one or more SGs. More specifically, information may be gathered regarding what portion of each SG I/O workload is directed to each of the SPs 102a-102N.

Figure 5:
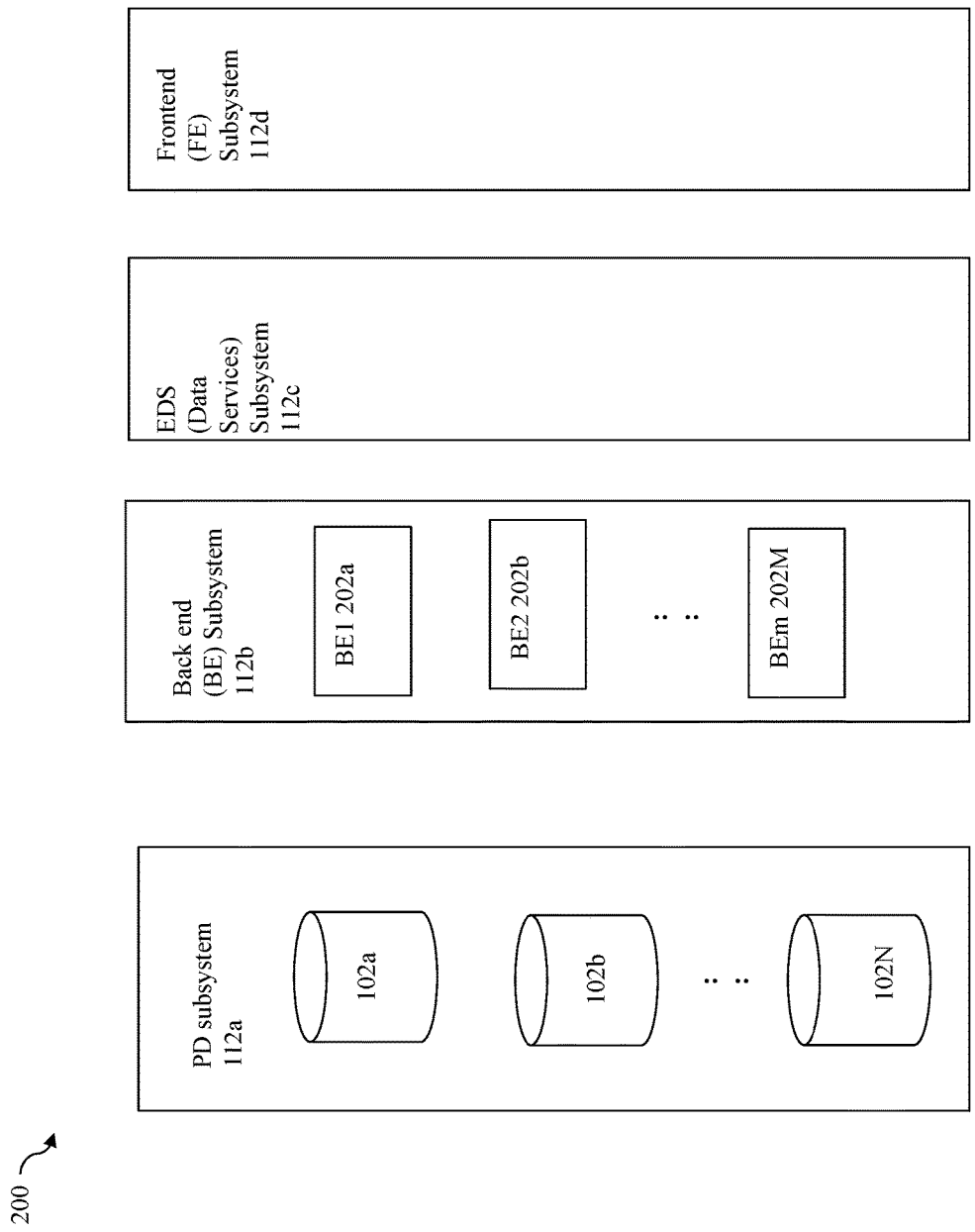

Referring to FIG. 5, shown is another example of how a data storage system may be partitioned into subsystems in an embodiment in accordance with techniques herein. The example 200 includes the same 4 subsystems as in 150 with the added difference of further partitioning/grouping components of the BE subsystem 112b into BE subgroups 202a-202M. Again, whether such a further partitioning of BE subsystem 112b is performed into subgroups 202a-202M depends on the information available for a particular embodiment as well as the desired level of granularity of subsystem/subgrouping for modeling, estimating utilization or load, and the like. In at least one embodiment, there may be particular DAs or backed resources of 112b which are assigned to service I/Os directed to each of the different SPs 102a-102N, where the BE components may be further partitioned into subgroups 202a-M for use with techniques herein.

Generally, the subsystems in the data storage system may have an associated ordering dependency such as related to the I/O path. With reference to FIG. 5 in the example 200, an I/O sent by an application on a host may be received by the FE subsystem 112d of data storage system. The depth or number of other subsystems which perform processing on behalf of the I/O operation may vary with particular attributes or characteristics of the I/O operation, such as whether the I/O is a read or write operation, the size of the I/O operation (e.g., amount of data read or written), whether the I/O results in a cache miss or cache hit (e.g., such as with a read hit where the I/O may be serviced using the cached data copy), and the like. For purposes of illustration, the various subsystems of 200 will be described with reference to a write I/O operation received by an FA of the FE subsystem 112d. In this case, the write operation may be processed by the EDS subsystem 112c such as to obtain a cache slot to store the write pending (WP) data in. At a later point in time, the BE subsystem 112b may write out the WP data from cache to a PD included in one of the SPs 102a-N of the PD subsystem 112a. Thus, when an I/O is received, the potential I/O path through the subsystems performing processing for the I/O, in order, is 112d, 112c, 112b and 112a. In this manner, 112a may be denoted as the innermost depth subsystem and 112d may denote the outermost depth subsystem. Load on subsystem 112c depends on what I/Os are passed from 112d to 112c for processing. Similarly, load on subsystem 112b depends on what I/Os are passed through both 112c and 112d for processing by 112b, and load on subsystem 112a depends on what I/Os are passed through 112b-d for processing by 112a. In one aspect, there is a load dependency between the subsystems 112a-d in that an I/O requiring processing by subsystem 112a means that resources of subsystems 112b-d are also utilized. Similarly, an I/O requiring processing by subsystem 112b means that resources of subsystems 112c-d are also utilized; and an I/O requiring processing by subsystem 112c means that resources of subsystems 112d are also utilized. Such a dependency may be reflected in modeling, such as performance modeling and resource utilization, of the various subsystems. Additionally, such dependency may be used in selecting a particular order in which overloaded subsystems are processed using techniques herein when there are multiple overloaded subsystems. In such a case where there are multiple overloaded subsystems, processing may be performed to resolve the overload condition by processing the overloaded subsystems in order from innermost depth to outermost depth (e.g., sequential order 112a, 112b, 112c and 112d). This is because, for example, reducing load of subsystem 112a may also result in reducing the load of one or more other load dependent subsystems 112b-d through which the I/O has passed to reach 112a (e.g., one or more other subsystems also performing work and thus consuming resources to process the I/O that has reached subsystem 112a).

Generally, estimation or modeling of the workload of each subsystem, or subgroup thereof if desired, may be performed using any suitable technique. In at least one embodiment, modeling may be performed using information regarding the resources consumed for each I/O operation processed. For each type of I/O operation (characterized based on one or more attributes), the load impact to each of the subsystems 112a-d may be estimated. For example, the I/O may classified based on whether the I/O is a read or write, whether the I/O results in a cache hit or miss, the size of the I/O, and the like. For each particular I/O classification based on one or more attributes, modeling may estimate the load each individual I/O places on each of the subsystems 112a-b, and if available, the particular subgroup thereof, such as the particular one of the SPs 102a-N to which the I/O is directed. (e.g., I/O may be directed to a LUN and offset or logical location on the LUN; the LUN and offset may be further mapped to the particular one of the SPs 102a-N including data corresponding the LUN and offset). To further illustrate, if the I/O is a read hit, subsystem 112d may be the only subsystem needed to service the I/O since the read data may be directly obtained from cache by an FA of the FE subsystem 112d. Modeling may estimate the particular components and amount of time such components of 112d are used in servicing the read hit. As another example, assume the I/O is a read miss where subsystems 112a-d may be used in servicing the I/O. Modeling may estimate the particular components and amount of time such components are used in the subsystems 112a-d in servicing the read miss.

For each subsystem 112a-d there may be a model which takes I/O workload directed to the subsystem as an input for the subsystem and determines the resulting load such as in terms of utilization and RT contribution for the subsystem. In connection with techniques herein, for example, with the FE subsystem 112d, the utilization of 112d may be based on the modeled or estimated load/utilization of the processors and ports of the FE.

For each SG, the total I/O workload may be measured, such as by monitoring received I/Os directed to particular LUNs of the SG. Furthermore, using the knowledge regarding the resource utilization or load impact on each subsystem for each I/O based on I/O classification as noted above, an embodiment may estimate or model the percentage of each SG workload going to each of the subsystems 112a-d, and also further each SP 102a-102N of the subsystem 112a (e.g., also using LUN to SP/PD mapping information as described elsewhere herein).

Figure 5A:
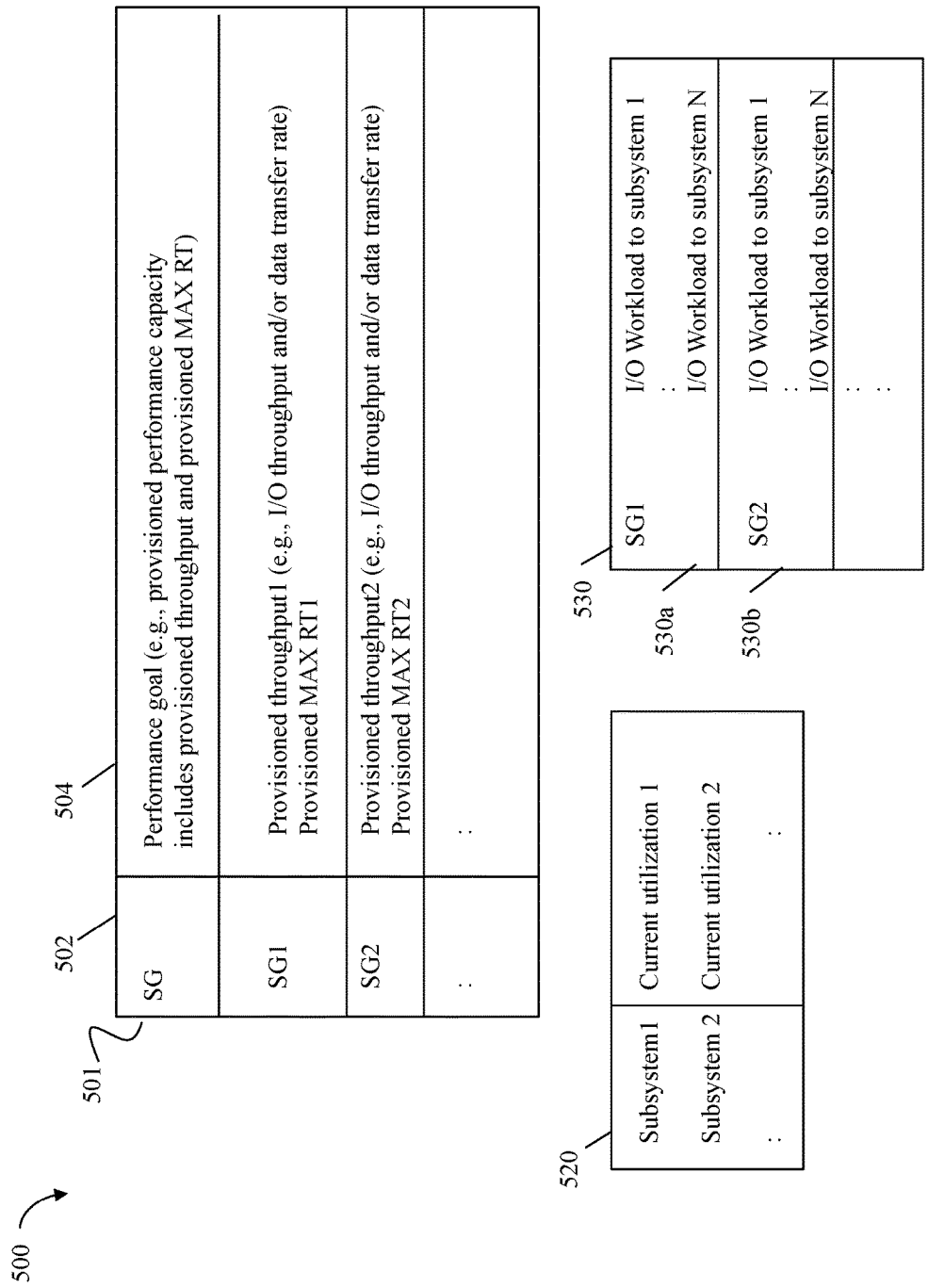
FIG. 5A is an example of information that may be used in an embodiment in accordance with techniques herein.

Referring to FIG. 5A, shown is an example 500 of tables of information that may be used in an embodiment in accordance with techniques herein. The table 501 includes SG performance goals for SGs. As described herein, the performance goal for an SG may be also referred to as provisioned performance capacity expressed in terms of provisioned throughput and provisioned MAX RT whereby the goal or target for the SG is that the SG will have an I/O RT (e.g., average I/O RT) that does not exceed MAX RT of the SG's performance goal so long as the SG has a current measured throughput that does not exceed the provisioned throughput of the SG's performance goal. The table 501 includes a row for each SG. Column 502 identifies the particular SG and column 504 identifies the SG's performance goal. For example, the first row of 501 indicates the performance goal for SG1 which includes provisioned throughput 1 and provisioned MAX RT1. The table 502 denotes the current utilization, such as in terms of percentages, of the different subsystems. Table 530 includes the I/O workloads of the various SGs and what portion of percentage of the I/O workload of each SG reaches each of the particular subsystems.

Using information such as described herein and illustrated in FIG. 5A, an embodiment in accordance with techniques herein may determine if there is an SG performance goal violation (e.g., performance violation where the SG is missing its performance goal). In at least one embodiment in accordance with techniques herein, an performance goal violation for an SG may be determined when the SG has a current throughput that does not exceed the provisioned throughput of the SG's performance goal but the current RT for the SG exceeds the RT MAX of the SG's performance goal (e.g., current throughput<=provisioned throughput AND current RT>RT MAX). In an embodiment in accordance with techniques herein, the SG may not have a performance goal violation if the SG's current RT>MAX RT and current throughput>provisioned throughput whereby the SG is consume resources beyond of the provisioned performance capacity).

In at least one embodiment, a subsystem may be determined to be overloaded if its current utilization level exceeds a specified threshold. The utilization threshold may be determined using any suitable technique and may vary with subsystem and its components. For example, a utilization threshold may be a percentage of the total capabilities of the subsystem resources (e.g., N %, where N is less than 100% of processing capabilities and data transfer capabilities of components of the subsystem).

In at least one embodiment in accordance with techniques herein, processing to throttle down I/O processing of one or more SG may be triggered by the occurrence of at least one overloaded component and at least one SG performance goal violation. Responsive to the foregoing, processing may be performed to alleviate or reduce the utilization (e.g., load) and thus I/O workload on the overloaded subsystem. Processing performed may include selecting one or more candidate SGs which are consuming resources beyond that specified in the performance goal of the SG. Different factors or criteria that may be used in selecting and/or ranking candidate SG are described elsewhere herein. For example, an SG may be candidate for having its I/O workload reduced or throttled downward if the SG has a current throughput that exceeds the provisioned throughput of the SG's performance goal, along with one or more additional factors. In at least one embodiment, the SG may have its workload reduced by an amount that does not fall below the provisioned throughput of the SG's performance goal. For example, it may be determined to reduce, throttle down and limit SG1's workload by a first amount DELTA1. The model for the particular overloaded subsystem may be used to model the resulting corresponding change in current utilization if the workload to the overloaded subsystem is reduced by DELTA1. In this manner, a set of candidate SGs may be determined each having a current throughput exceeding the provisioned throughput of the SG's performance goal (e.g., each SG of the set is consuming resources beyond those promised in the SG performance goal). SGs may be selected from the set (e.g., ranked) in an order determined in accordance with any suitable criteria examples of which are described elsewhere herein. The foregoing processing of repeatedly: selecting an SG, determining an amount by which to reduce the SG's workload, determining a corresponding reduction in utilization of the overloaded subsystem—may be performed until the subsystem under consideration has a modeled utilization that does not exceed the specified utilization threshold (e.g., where a current utilization over the utilization threshold places the subsystem in an overloaded state).

In at least one embodiment, selectivity as described above may be used to form bands or groupings of SGs consuming more resources than those denoted by provisioned throughput of the SG performance goals. As discussed elsewhere herein, selectivity may denote a fraction or percentage of the SG workload directed to a particular subsystem. Thus, selectivity of an SG may vary with the particular subsystem under consideration. In at least one embodiment, a first or highest ranked band of SGs may include those having at least a first minimum percentage of SG workload reach the overloaded subsystem. In a similar manner, multiple bands—each denoting an SG workload percentage range— may be defined and SG's may be placed in a particular one of the bands depending on the percentage of the SG workload estimated or modeled as reaching the overloaded subsystem under consideration. In at least one embodiment, SGs may be considered for throttling down workload starting with SGs in the first or highest ranked band and then proceeding with successively lower ranked bands. SGs may be considered for workload reduction or throttling until the modeled resulting utilization of the overloaded subsystem falls below its specified utilization threshold (used for determining when a subsystem is overloaded). In at least one embodiment, SGs falling into a single band may have workload reduced by a same amount.

In at least one embodiment, the amount DELTA1 described above may subtracted from the current throughput for the SG (denoting the actual amount of resource consumption of the SG). As noted above, the current throughput exceeds the provisioned throughput of the SG's performance goal and techniques herein may throttle down or reduce the resources consumed by the SG by temporarily introducing a throttling limit for the SG. The limit may be, for example, the difference between the current throughput of the SG and DELTA1. The limit may denote the maximum allowable amount of resources the SG can consume (e.g., current throughput for the SG may be adjusted downward by continually introducing delays in connection with the SG's I/O processing until the measured current throughput does not exceed the limit. Thus, the limit may be imposed to control or reduce resources consumed by the SG so as not to exceed the limit. In one aspect the limit may be a new target or goal limit temporarily used for the SG).

Consistent with discussion elsewhere herein, if there are multiple overloaded subsystems, at least one embodiment in accordance with techniques herein perform processing as described above for each subsystem to reduce the load thereon in a particular order from innermost subsystem to outermost subsystem. The innermost subsystem (e.g., PD subsystem 112a) may be ordered as 1 or first, and the outermost subsystem (e.g., FE subsystem 112d) may be ordered as last. Processing to reduce overloaded subsystems may include processing overloaded subsystems in accordance with the foregoing sequential ordering. Furthermore, if a particular subsystem has been further partitioned or divided into subgroups, such processing may be performed to specifically reduce the load of the subgroup(s) which are overloaded rather than focus in reducing the load (e.g., utilization) of the entire subsystem.

Such one or more throttling limits with respect to I/O workload as determined using techniques herein may be imposed temporarily, such as for a specified time period where reassessment/evaluation is again performed following the specified time period. If the condition of a performance goal violation and at least one overloaded subsystem persists, processing may be repeated where: additional SGs have workload limits specified to throttle down workload processed for the SG and/or where existing imposed limits on one or more SGs are further decreased or throttled further adjusted downward (thereby further restricting or limiting resource consumed by such SGs. If the condition of a performance goal violation and at least one overloaded subsystem does not persist, processing may be performed to relax the throttling limits. It should be noted that an embodiment may consider any suitable one or more criteria or factors in connection with imposing limits, increasing existing limits, and also removing or relaxing (e.g., increasing) specified throttling limits. Examples are described elsewhere herein.

Figure 6:
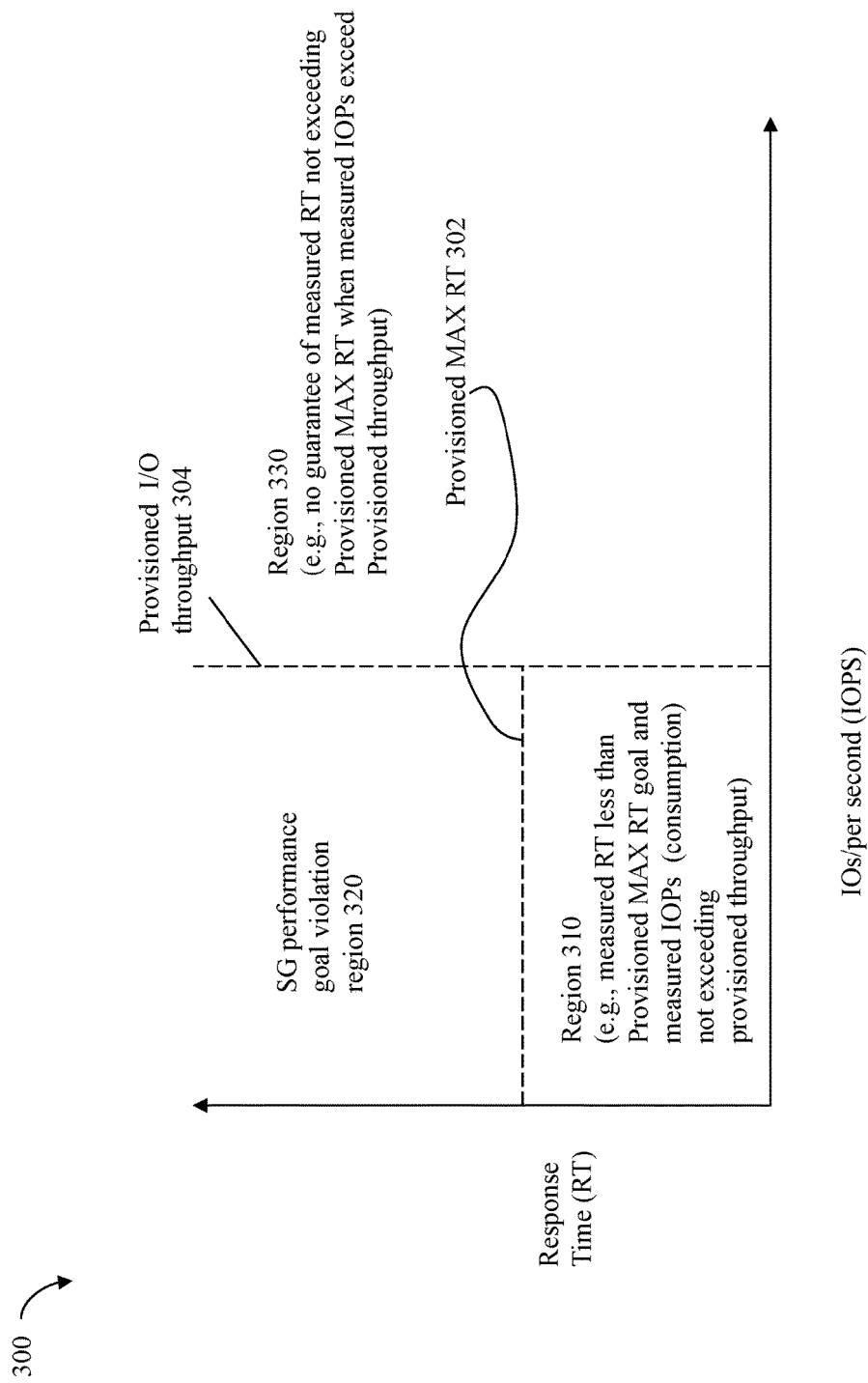
FIG. 6 is a graphical illustration of regions and performance goals in an embodiment in accordance with techniques herein.

Referring to FIG. 6, shown is a graphical illustration of performance goals of an SG in an embodiment in accordance with techniques herein. The example 300 includes an X axis labeled with IOPS and Y axis with response time (RT). In this example, the provisioned throughput of the SG performance goals may be expressed in terms of IOPS. For an SG having a performance goal with a provisioned MAX RT and a provisioned throughput expressed in IOPs, line 302 may a horizontal line denoting the provisioned MAX RT, and vertical line 304 may denote the provisioned throughput. For such an SG, region 310 may denote a balanced state for the SG meeting its performance goal of not exceeding its MAX RT 302 while also not over-consuming provisioned resources as denoted by provisioned throughput 304. Consistent with discussion herein, an SG performance goal violation may be determined if the SG has a current resource consumption rate and current RT that falls into region 320 whereby the current RT exceeds MAX RT302 and the current resource consumption (e.g., current I/O throughput in terms of TOPS) does not exceed the provisioned throughput 304. Region 330 may denote the range of measured throughput (e.g., resource consumptions) for which there is no guarantee regarding a particular measured RT. In other words, if the SG consumes more resource than as denoted by the provisioned throughput of the performance goal, there is no guarantee what actual RT may be obtained for the SG (e.g., no guarantee of measured RT not exceeding provisioned MAX RT when measured IOPs exceed provisioned throughput).

In at least one embodiment in accordance with techniques herein, the throttling limits may be specified in terms of host or FE I/Os (e.g. I/Os received by the FE components of the data storage system). In a similar manner, other measurements as described herein may be expressed in terms of FE or host I/Os as opposed to, for example, BE I/O operations. For example, as will be appreciated by those skilled in the art, a single FE or host I/O operation may result in no BE I/Os (e.g., read hit) or multiple BE I/Os (e.g., such as with mirroring and more generally different RAID group configurations that may be implemented for PDs of the subsystem 112a).

It should be noted that in at least one embodiment as described herein, techniques may be performed to throttle down the I/O workload or activity with respect to an SG considered as a whole. As an alternative, such throttling down may be applied to a particular portion of the SG's I/O workload where the particular portion includes I/Os of a particular type possessing one or more specified I/O attributes or characteristics (e.g., read misses, read hits, writes, etc.). As a variation, an embodiment in accordance with techniques herein may also use particular I/O workload characteristics in selecting particular SGs to have workload throttled down for a particular subsystem or subgroup. For example, if PD subsystem 112a or BE subsystem 112b is overloaded, SGs having write heavy workloads may be selected for throttling downward (e.g., subjecting such SGs to throttling limits).

What will now be described in more detail is one particular embodiment in accordance with techniques herein which, with reference to FIG. 5, includes: PD subsystem 112a partitioned into SPs 102a-N; BE subsystem 112b, and FE subsystem 112d. Such partitioning may be used in a data storage system that can dynamically modify FE or Host I/O Limit controls for total host or FE IOPS and total host or FE Xfer (e.g., denoting data transfer rate). In this example, processing uses measurements of FE and BE CPU utilization (e.g., subsystem level utilization for subsystems 112b and d), and SP performance capacity utilization (e.g., denoted by the different SPs 102a-N of PD 112a). Other embodiments could include consideration of additional components, such as communication ports, other type of controller CPU, etc.

Processing described herein may be performed to temporarily modify FE or Host I/O Limits (to values that are calculated by the partitioning algorithm) to throttle the host IOPS and/or Xfer of a given tenant (e.g., SG) anywhere above the level of the provisioned IOPS or Xfer of the tenant (e.g., as in the SG performance goals) and below any user configured maximum host throughput limit for the tenant. In at least one embodiment, such processing may temporarily lower the provisioned performance capacity of the tenant workloads in cases where overload exists even when no tenant is exceeding its configured provisioned performance capacity. The partitioning mechanism described in the following embodiment will only modify IOPS throttling for a tenant that has a finite provisioned IOPS level, and it will only modify Xfer throttling for a tenant that has a finite provisioned Xfer level. For tenants that having both finite provisioned TOPS and Xfer levels specified in performance goals, the algorithm may impose temporary Host I/O Limits of either type—or both types.

The processing performed for techniques herein may periodically assesses system/subsystem state and tenant (e.g., SG) performance state to determine whether the need exists to introduce any new temporary Host I/O Limit controls, or whether there are any existing temporary limit settings that need to be modified. The interval between partitioning planning operations is referred to as the FEBiasPlanningCycle.

Processing may maintain an OverloadEscalation metric, at the system level, which provides a measure of how long a contention condition has existed that poses a threat to achieving tenant/SG workload performance goals. Such a contention for resources may be detected when at least one subsystem is overloaded such as described herein. In at least one embodiment, the OverloadEscalation metric ranges between 0 and 1, where zero means that no qualifying overload condition has existed for a while, and 1 means that overload conditions have existed for long enough for the partitioning mechanism to have fully escalated the intensity of its remedial actions. Processing may also maintain time-averaged measures of tenant level activity or workload, such as current or measured IOPs and RT.

For each workload (e.g., tenant such as SG), CurrentTotalSGXfer and CurrentTotalSGIOPS limits may be maintained. The foregoing may denote the current host or FE I/O limits that are being applied to a particular tenant or SG. These values default to the user assigned maximum Host I/O Limit values from the performance goal for the SG. In at least one embodiment, default values for the foregoing may be those as indicated in the provisioned throughput of the SG performance goal and should be at these default values at any time that the OverloadEscalation level is zero).

In at least one embodiment, a function referred to as ImplicitReadRTGoal( ) may be used to calculate the read response time goal by which workloads are judged during an overload event (e.g., at least one subsystem overloaded). In other words, the foregoing function may return the RT goal used for an SG. ImplicitReadRTGoal( ) is a function of the provisioned MAX RT (of the SG performance goal), the OverloadEscalation level, the degree to which the workload of an SG is exceeding its provisioned throughput (of the SG performance goal), and the importance-of-achieving priority parameter from the performance policy of the workload. The purpose of this function is to manage the degree to which read response time increase is experienced across the workloads as escalation proceeds. The ImplicitReadRTGoal( ) function calculates an adjusted 16 KB FE read response time goal—this may be compared to the observed normalized read response time of a workload to determine whether it will be exempted from increased throttling (or the onset of throttling), as described below.

Processing in at least one embodiment may use one or more of the following parameters to shape the timing of growth and decay of the escalation level:
 FETimeStep—the interval at which measurements are made of workload state and system state.
 FEBiasPlanningCycle (also referred to herein as planning cycle)—the period of the operation that recalculates and reapplies FE biases and thereby modifies or sets I/O limits. This interval may be, for example, 5 minutes or more. It should be noted an embodiment may consider how quickly the system responds to I/O limit changes or throttling limits when selecting an amount of time denoted by the planning cycle.
 EscalationFactor—the factor by which the OverloadEscalation measure grows when contention is detected in a planning cycle. This factor also determines the pace at which Tenant level Host I/O limits are tightened in the direction of provisioned throughput levels when the partitioning mechanism tightens limits.
 DeEscalationFactor—the factor by which OverloadEscalation decreases when contention has not been detected for an interval of time equal to at least DeEscalationDelay. This factor also determines the pace at which Tenant level Host I/O limits are relaxed when the partitioning mechanism relaxes limits on a given tenant.
 DeEscalationDelay—the number of consecutive FETimeSteps for which no contention must have been observed in order for the OverloadEscalation factor to start decaying, and for any temporary Tenant level Host I/O limits to begin relaxing.

Generally, escalation parameters, such as the above-noted EscalationFactor, may generally denote a level of aggressiveness by which to apply or further extend I/O throttling limits imposed using techniques herein. Similarly, de-escalation parameters (e.g., DeEscalationFactor and DeEscalationDelay) denote a level of aggressiveness in which to relax or unwind imposed I/O throttling limits of techniques herein.

Processing for each FEBiasPlanningCycle may proceeds as follows:

1. Determine which storage subsystems (e.g., FE 112*d*, BE 112*b* and/or PD 112*a*) are in an overload state or are at risk of becoming overloaded, using statistics pertaining to the planning cycle or interval that just completed.
2. Determines whether any tenant performance goals are in violation.
3. If resource contention was observed during the planning cycle (e.g., at least one subsystem is overloaded), and at least one workload performance goal is in violation, then:
 A. The OverloadEscalation state variable is decayed upwards (e.g. increased).
 B. For each tenant that has existing temporary Host I/O limits configured, a comparison is made between the observed current rates and the current limits—if the observed rates are higher than the configured limits by more than a certain amount, then the Tenant is not considered to be eligible for having its limits tightened. If more than a certain number of Tenants are in this state, then the planning cycle is aborted without making changes to any limits (since the system hasn't responded to the new limits yet).
 C. The 'ImplicitReadRTGoal' for each workload is calculated. Depending on the escalation level, the degree to which the workload is exceeding provisioned rates and the workload priority the implicit response time goal may be higher than the provisioned Read Response time goal by some amount.
 D. Potential Donor tenants are identified—these are tenants that are currently operating above their provisioned IOPS or Xfer throughput (the algorithm also require that the tenant normalized SLO response time be less than the ImplicitReadRTGoal calculated in step C above). For each donor tenant the algorithm determines which provisioned limit (IOPS or Xfer) is being exceeded by the greater amount: this will be the type of limit that is tightened if the partitioning algorithm elects to tighten limits on the tenant in the course of the current planning step.
 E. If overload conditions exist even without having any tenants operating beyond their provisioned performance capacity, the effective provisioned performance capacities of the tenants are temporarily recalculated (possible resulting in lower values) and step D is repeated. When calculating reductions in the effective provisioned performance capacity the algorithm considers the relative business priority of the tenant: tenants with lower priority get their allotments reduced more quickly.
 F. PD subsystem 112*a*, per SP Overload Step: This step calculates performance capacity reductions needed related to the PD subsystem 112*a* being overload. The objective of this step is to identify the throughput limit changes that will produce the desired utilization reduction in each overloaded SP with the minimum amount of throttling: if tenants that make heavier use of a resource than others are throttled more, than less 'wasted throttling' will occur. The following is performed for each SP that is experiencing overload:
  i) A decision is made about the amount of utilization that will be removed from the SP to bring utilization down to an acceptable level. This can be a predetermined value based on the disk type (e.g., 20% for EFD)—or it can be set more aggressively based on system conditions, workload priorities, etc.
  ii) A decision is made about the number of logical quantums to divide the workload reduction into. This number will depend on the amount of work to be removed and the number of potential tenants to choose from.

iii) A loop is performed over the quantums or workload reduction, using the appropriate cost function to select the best tenant to subtract the quantum of workload from.

G. Back-End Controller CPU Overload Step for BE subsystem 112*b*: The BE subsystem 112*b* may be processed at the subsystem level or per component/subgroup of BE components 202*a*-202M depending on available metrics and controls. More targeted action can be taken by considering overload at a more granular level, such as per subgroup for each of 202*a*-M. This general subgrouping within a subsystem may be further applied to other subsystems such as the FE subsystem 112*d* depending on available metrics and control. Generally, this step g) calculates limit adjustments related to BE overload. The objective of this step is to identify the limit changes that will produce the desired utilization reduction in each overloaded set of BE components with the minimum amount of throttling: if Tenants that make heavier use of a resource than others are throttled more, than less 'wasted throttling' will occur. The following is performed for each back-end controller CPU Group that is experiencing overload:

i). A decision is made about the amount of utilization removed from the BE subsystem 112*b* to bring utilization down to an acceptable level. If a utilization model is available, this can be expressed as a predetermined amount of utilization (like 20 percent). Otherwise the size of the reduction can be a designated fraction of the host load that is current directed to the component.

ii). A decision is made about the number of logical quantums to divide the workload reduction into. This number will depend on the amount of work to be removed and the number of potential tenants to choose from.

iii). A loop is performed over the quantums or workload reduction, using the appropriate cost function to select the best tenant to subtract the quantum of workload from.

H. Front-End Controller CPU Overload Step for FE subsystem 112*d*: Generally, this step calculates limit adjustments related to FE component/subsystem overload. The objective of this step is to identify the limit changes that will produce the desired utilization reduction in each overloaded set of FE components with the minimum amount of throttling: if tenants that make heavier use of a resource than others are throttled more, than less 'wasted throttling' will occur. The following is performed for each FE Group that is experiencing overload:

i). A decision is made about the amount of utilization that will be removed from the FE subsystem 112*d* to reduce utilization down to an acceptable level. If a utilization model is available, this can be expressed as a predetermined amount of utilization (e.g., 20 percent). Alternatively, an embodiment may denote the size of the reduction a designated fraction of the host I/O load that is current directed to the FE subsystem.

ii). A decision is made about the number of logical quantums to divide the workload reduction into. This number will depend on the amount of work to be removed and the number of potential tenants to choose from.

iii). A loop is performed over the quantums or workload reduction, using the appropriate cost function to select the best tenant to subtract the quantum of workload from.

I) The aggregate throughput reductions for each tenant from the steps above may be calculated, and used to assigned values to changes to the CurrentTotalSGXfer and CurrentTotalSGIOPS denoting throttling limit values for each tenant. If temporary limits already existed on a given tenant, the new limits for the tenant may be the current limits decayed/increased upward toward the calculated limits by EscalationFactor. If temporary limits are introduced on the tenant (e.g. no existing limits), the new temporary limit may be the recent observed rate for the tenant decayed toward the calculated limits by the EscalationFactor.

4. If contention was not observed in the current FEBiasPlanningCycle, but was observed within the last DeEscalationDelay FETimeSteps, then no adjustments may be made to the OverloadEscalation state or to the CurrentTotalSGXfer and CurrentTotalSGIOPS throttling limit values.

5. If contention has not been observed for the last DescalationDelay FETimeSteps, and utilization levels are below a certain level, then the OverloadEscalation factor may be decayed downwards (using DeEscalationFactor) and the CurrentTotalSGXfer and CurrentTotalSGIOPS values are loosened for workloads to which temporary constraints were applied. When loosening limits of a tenant that has temporary limits for TOPS and Xfer, both types of limits may be loosened. Limits are loosened (e.g., increased) by decaying upwards by the DeEscalationFactor. The timescale over which limits are relaxed may be longer than the timescale over which limits are tightened (e.g., by a factor of 4 or so). When loosening limits, reductions to provisioned performance capacity may be gradually removed (e.g., increased) as well.

Figure 7:
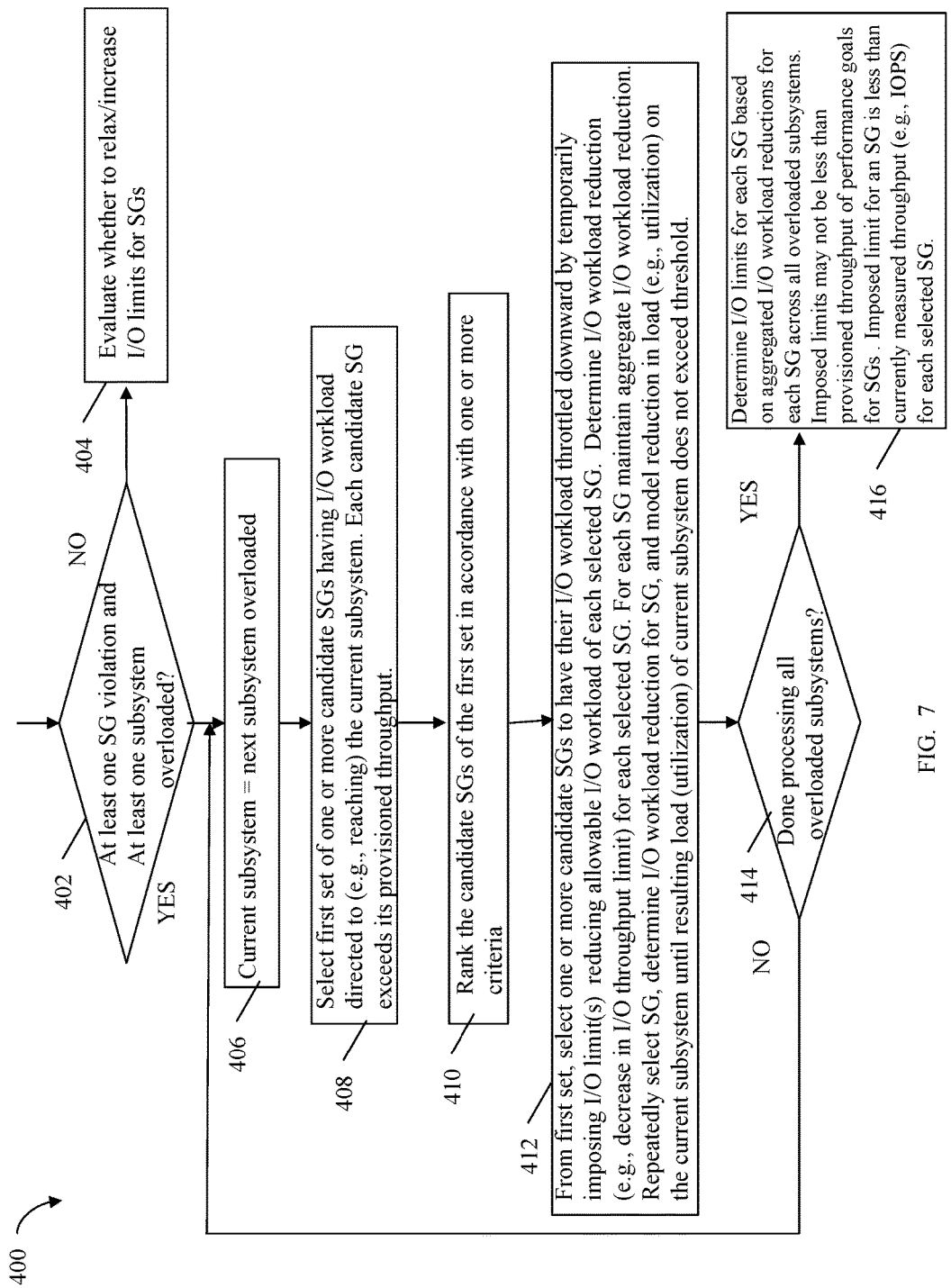
FIG. 7 is a flowchart of processing steps that may be performed in an embodiment in accordance with techniques herein.

Referring to FIG. 7, shown is a flowchart of processing steps that may be performed in an embodiment in accordance with techniques herein. The flowchart 400 generally summarizes processing as described above that may be performed in single evaluation, assessment or planning cycle. At step 402, a determination may be made as to whether there is at least one SG violation and at least one subsystem overloaded. If step 402 evaluates to no, control proceeds to step 404 where processing may be performed to determine whether to relax or increase any existing I/O throttling limits imposed on SGs. If step 402 evaluates to yes, control proceeds to step 406 where current subsystem is assigned the next overloaded subsystem to be processed. At step 408, processing is performed to select a first set of one or more candidate SGs having I/O workload directed to (e.g., reaching) the current subsystem. Additionally, each candidate SG may exceed its provisioned throughput of the SG performance goal. At step 410, the candidate SGs of the first set may be ranked in accordance with one or more criteria where such criteria may affect the order in which SGs of the first are considered for downward workload throttling and may also affect an amount by which the SG has its workload reduced or throttled downward. At step 412, processing may be performed with respect to the first set of SGs. Step 412 may include selecting one or more candidate SGs of the first set to have their I/O workload throttled downward by temporarily imposing I/O limit(s) reducing allowable I/O workload of each selected SG (e.g., imposing the throttling limit as a new temporary goal or target for the SG for which the system performs processing to introduce additional processing delays in attempts to slow down the SG workload as measured or observed to be that as specified by the imposed limit). Step 412 may include determining an I/O workload reduction (e.g., decrease in I/O throughput limit) for each selected SG. For each SG, processing may maintain an aggregate I/O workload reduction variable denoting the amount of reduction in throughput imposed on the SG. The aggregate I/O workload reduction may be updated with processing performed with respect to each subsystem or subgroup. Step 412 may include, with respect to the current subsystem under consideration, repeatedly: selecting an SG, determining an I/O workload reduction for the SG, and modeling the reduction in load (e.g., utilization) on the current subsystem until resulting load (utilization) of current subsystem does not exceed threshold. As described herein and may vary with level of subsystem granularity and grouping, step 412 may further include performing processing as described herein for each overloaded subgroup of components in the overloaded subsystem under consideration (e.g., current subsystem). At step 414, a determination is made as to whether processing has completed for all overloaded subsystems. If step 414 evaluates to no, control returns to step 406 to perform processing for the next overloaded subsystem. If step 414 evaluates to yes, control proceeds to step 416. In step 416, processing may include determining I/O throttling limits for each SG based on aggregated I/O workload reductions made for each SG across all overloaded subsystems. As described herein, any such imposed throttling limits may not be less than the provisioned throughput of performance goals for SGs. The imposed limit for an SG may be less than the currently measured throughput (e.g. IOPS) for each selected SG. At a point in time, if a measured throughput for an SG exceeds an imposed throttling limit for the SG, it may mean that the system has not yet fully responded to the imposed limit (e.g., has not had sufficient time for the imposed limit to take effect).

Consistent with discussion herein, throttling limit adjustments may be made based, for example, on a desired level of aggressiveness, amount of time since no contention detected, and the like, as may be reflected in various state parameters (e.g., escalation and de-escalation values) described herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing dynamic resource partitioning comprising:
    receiving a plurality of performance goals for a plurality of consumers, each of the plurality of performance goals denoting a performance goal for a different one of the plurality of consumers;
    performing first processing to determine whether one or more of a plurality of subsystems are overloaded and whether at least a first consumer of the plurality of consumers violates a corresponding one of the plurality of performance goals specified for said first consumer, wherein the plurality of consumers are a plurality of storage groups for a plurality of applications; and
    responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded, wherein said second processing includes:
        selecting a first set of one or more storage groups of the plurality of storage groups wherein each storage group of the first set has an associated I/O workload throttled downward by imposing an associated I/O throttling limit to reduce a current load of a particular one of the plurality of subsystems determined as overloaded, wherein each storage group of the first set is selected in accordance with one or more criteria including a level of selectivity of said each storage group related to an amount of the associated I/O workload of said each storage group directed to the particular one of the plurality of subsystems determined as overloaded.

2. The method of claim 1, wherein each of the plurality of storage groups including one or more logical devices comprising data for a corresponding one of the plurality of applications whereby said corresponding one application issues I/O operations to the one or more logical devices of said each storage group.

3. The method of claim 2, wherein said first processing includes determining whether a first subsystem of a plurality of subsystems is overloaded.

4. The method of claim 3, wherein said first subsystem is determined as overloaded when a current utilization of components of the first subsystem exceeds a specified maximum threshold utilization.

5. The method of claim 4, wherein each of the plurality of performance goals denotes a performance goal for a corresponding one of the plurality of storage groups and includes a provisioned throughput and a provisioned maximum response time whereby the performance goal for the corresponding one storage group indicates a goal of maintaining a current response time for the corresponding one storage group that does not exceed the provisioned maximum response time of said each performance goal when a current throughput for the corresponding one storage group does not exceed the provisioned throughput of said each performance goal.

6. The method of claim 5, wherein the provisioned maximum response time denotes an average I/O response time for the corresponding one of the plurality of storage groups, and wherein the provisioned throughput includes any of: an average I/O throughput, and an average data transfer rate, said provisioned throughput and said provisioned maximum response time being determined with respect to I/Os that are directed to the corresponding one storage group and that are received by a system comprising the plurality of subsystems.

7. The method of claim 6, wherein a first of the plurality of performance goals denotes a performance goal for a first of the plurality of storage groups, and wherein the first storage group is determined as violating the first performance goal responsive to a current throughput for the first storage group not exceeding the provisioned throughput of the first performance goal and a current response time for the first storage group exceeding the provisioned maximum response time of the first performance goal.

8. The method of claim 6, wherein each storage group of the first set has a corresponding one of the plurality of performance goals and said each storage group has a current throughput that exceeds the provisioned throughput of the corresponding performance goal for said each storage group, and wherein the associated I/O throttling limit for said each storage group of the first set denotes a maximum allowable throughput temporarily imposed for said each storage group.

9. The method of claim 8, wherein the maximum allowable throughput is not less than the provisioned throughput of the corresponding one of the plurality of performance goals for said each storage group and whereby the maximum allowable throughput is temporarily used rather than the provisioned throughput of the corresponding performance goal for said each storage group.

10. The method of claim 9, wherein the associated I/O throttling limit for said each storage group is enforced by reducing measured throughput for said each storage group whereby the measured throughput for said each storage group does not exceed the maximum allowable throughput imposed for said each storage group.

11. The method of claim 8, wherein each storage group of the first set of one or more storage groups is selected in accordance with the one or more criteria further comprising at least one of:
an amount by which said each storage group exceeds the current throughput for said each storage group exceeds the provisioned throughput of the corresponding performance goal for said each storage group;
an amount by which said each storage group exceeds the provisioned maximum response time of the corresponding performance goal for said each storage group; and
a priority of said each storage group relative to other ones of the plurality of storage groups.

12. The method of claim 2, wherein the plurality of subsystems are included in a data storage system.

13. The method of claim 12, wherein the plurality of subsystems include a first subsystem of front end components, a second subsystem of back end components, and a third subsystem of physical storage devices.

14. The method of claim 13, wherein the third subsystem includes a plurality of pools each including a plurality of physical storage devices.

15. The method of claim 13, wherein the second subsystem includes processors and ports of components that read data from, and write data to, the physical storage devices of the third subsystem.

16. The method of claim 13, wherein the first subsystem includes processors and ports of components that receive I/O operations from the plurality of applications executing on one or more host systems.

17. The method of claim 14, wherein the plurality of subsystems includes a fourth subsystem of components that facilitate processing for received I/Os and perform data services not handled by the first subsystem and the second subsystem.

18. A system comprising:
a processor; and
a memory comprising code stored thereon that, when executed, performs a method of dynamic resource partitioning comprising:
receiving a plurality of performance goals for a plurality of consumers, each of the plurality of performance goals denoting a performance goal for a different one of the plurality of consumers;
performing first processing to determine whether one or more of a plurality of subsystems are overloaded and whether at least a first consumer of the plurality of consumers violates a corresponding one of the plurality of performance goals specified for said first consumer, wherein the plurality of consumers are a plurality of storage groups for a plurality of applications; and
responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded, wherein said second processing includes:
selecting a first set of one or more storage groups of the plurality of storage groups wherein each storage group of the first set has an associated I/O workload throttled downward by imposing an associated I/O throttling limit to reduce a current load of a particular one of the plurality of subsystems determined as overloaded, wherein each storage group of the first set is selected in accordance with one or more criteria including a level of selectivity of said each storage group related to an amount of the associated I/O workload of said each storage group directed to the particular one of the plurality of subsystems determined as overloaded.

19. A non-transitory computer readable medium comprising code stored thereon that, when executed, performs method of dynamic resource partitioning comprising:
receiving a plurality of performance goals for a plurality of consumers, each of the plurality of performance goals denoting a performance goal for a different one of the plurality of consumers;
performing first processing to determine whether one or more of a plurality of subsystems are overloaded and whether at least a first consumer of the plurality of consumers violates a corresponding one of the plurality of performance goals specified for said first consumer, wherein the plurality of consumers are a plurality of storage groups for a plurality of applications; and
responsive to determining that one or more of the plurality of subsystems are overloaded and that at least a first consumer is not meeting the corresponding one of the plurality of performance goals specified for said first consumer, performing second processing to reduce workload directed to each of the one or more subsystems that are overloaded, wherein said second processing includes:
selecting a first set of one or more storage groups of the plurality of storage groups wherein each storage group of the first set has an associated I/O workload throttled downward by imposing an associated I/O throttling limit to reduce a current load of a particular one of the plurality of subsystems determined as overloaded, wherein each storage group of the first set is selected in accordance with one or more criteria including a level of selectivity of said each storage group related to an amount of the associated I/O workload of said each storage group directed to the particular one of the plurality of subsystems determined as overloaded.

* * * * *